(12) United States Patent
Obayashi et al.

(10) Patent No.: US 7,233,378 B2
(45) Date of Patent: Jun. 19, 2007

(54) ANTI-REFLECTION FILM, METHOD FOR PRODUCING THE SAME, AND IMAGE DISPLAY DEVICE

(75) Inventors: Tatsuhiko Obayashi, Minami-ashigara (JP); Takafumi Hosokawa, Minami-ashigara (JP); Kenichi Nakamura, Minami-ashigara (JP); Atsuhiro Okawa, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 147 days.

(21) Appl. No.: 10/354,961

(22) Filed: Jan. 31, 2003

(65) Prior Publication Data

US 2003/0175502 A1  Sep. 18, 2003

(30) Foreign Application Priority Data

Feb. 1, 2002 (JP) .............................. 2002-026092

(51) Int. Cl.
*G02B 1/11* (2006.01)
(52) U.S. Cl. .................... 349/137; 428/212; 428/323
(58) Field of Classification Search ................ 349/137; 428/323
See application file for complete search history.

(56) References Cited

U.S. PATENT DOCUMENTS

| | | | |
|---|---|---|---|
| 6,210,858 B1 * | 4/2001 | Yasuda et al. | 430/270.1 |
| 6,217,176 B1 * | 4/2001 | Maekawa | 359/601 |
| 6,383,559 B1 | 5/2002 | Nakamura et al. | |
| 6,686,031 B2 * | 2/2004 | Matsufuji et al. | 428/212 |
| 6,710,923 B2 * | 3/2004 | Ito | 359/599 |
| 6,731,363 B2 * | 5/2004 | Nakamura et al. | 349/137 |
| 6,791,649 B1 * | 9/2004 | Nakamura et al. | 349/137 |

FOREIGN PATENT DOCUMENTS

| | | |
|---|---|---|
| JP | 2001-166104 A | 6/2001 |
| JP | 2001-188104 | 7/2001 |

\* cited by examiner

*Primary Examiner*—H. Thi Le
(74) *Attorney, Agent, or Firm*—Buchanan Ingersoll & Rooney PC

(57) ABSTRACT

An anti-reflection film containing a high-refractive-index layer having a refractive index of 1.65 to 2.40 and a low-refractive-index layer having a refractive index of 1.20 to 1.55, wherein the high-refractive-index layer is formed by coating and hardening a coating solution composition that contains inorganic fine particles having an average particle size of 1 to 200 nm and being dispersed with a polymer having a crosslinkable group. A method of producing the anti-reflection film and an image display device provided with the anti-reflection film.

22 Claims, 1 Drawing Sheet

ANTI-REFLECTION FILM, METHOD FOR PRODUCING THE SAME, AND IMAGE DISPLAY DEVICE

FIELD OF THE INVENTION

The present invention relates to an anti-reflection film comprising a high-refractive-index layer and a low-refractive-index layer, and to an image display device provided with the anti-reflection film.

BACKGROUND OF THE INVENTION

Anti-reflection films are generally provided on the surface of optical products and the like, for suppression of reflectance based on the principle of optical interference, in order to prohibit reduction in contrast owing to reflection of external light, and also to prevent the display surface from mirroring the surrounding scene. Particularly in such image display devices as a cathode-ray tube display device (CRT), a plasma display panel (PDP), and a liquid crystal display device (LCD), each of which requires that a display image be clearly viewed, the anti-reflection film is arranged at the outermost surface of the display.

Such anti-reflection films can be formed by laminating plural transparent thin layers, which are different in refractivity, and multi-layered films, in which transparent metal oxide thin films are laminated, have been ordinarily used.

Such transparent metal oxide thin films are formed by a chemical vapor deposition (CVD) process or a physical vapor deposition (PVD) process, and particularly by a vacuum vapor deposition process, which is a physical vapor deposition process. These transparent metal oxide thin films have excellent optical characteristics as an anti-reflection film. However, the method of forming a transparent metal oxide thin film by such vapor deposition is insufficient from the standpoint of productivity for mass production.

In place of the vapor deposition process, from the standpoint of mass production, it has been proposed to form anti-reflection films by applying a coating composition containing inorganic fine particles.

For example, JP-A-8-110401 ("JP-A" means unexamined published Japanese patent application) and JP-A-8-179123 disclose a technique that forms a high-refractive-index layer, having a refractive index of 1.80 or more, by incorporating inorganic fine particles having a high refractive index into a plastic, and then applies the high-refractive-index layer to an anti-reflection film. To form a transparent film as a high-refractive-index layer by coating inorganic fine particles, it is necessary to make the particles sufficiently fine and to disperse the particles uniformly in the layer. To disperse the inorganic particles, it has been known to use surfactants or anionic or cationic polymers for dispersion. However, these compounds cannot form bonds with the crosslinked film, after dispersion, and there is a problem that these compounds deteriorate physical strength and chemical resistance of the film.

On the other hand, U.S. Pat. No. 6,210,858, U.S. Pat. No. 6,383,559, JP-A-2001-166104, and JP-A-2001-188104 each disclose an anti-reflection film having, as a high-refractive-index layer, a film containing therein inorganic fine particles dispersed with a crosslinked polymer having an anionic group. Each publication describes an example that the polymer in the high-refractive-index layer is formed by a polymerization reaction of multifunctional monomers, simultaneously with coating the monomers or after coating the monomers. The anti-reflection films have such excellent properties as (1) high productivity at low price, (2) a high-refractive-index layer having a very high refractive index and transparency, and (3) excellent scratch resistance.

By intensive studies on the above-said anti-reflection films, the present inventors revealed a problem that the film mechanical strength was easily lowered by a saponification processing necessary to put an anti-reflection film on a polarization plate. From analysis by the present inventors, it was also revealed that this was caused by penetration of a saponificating liquid into a portion at which a crosslinking reaction was not sufficiently occurred, and by elution of a monomer component that was not completely hardened.

SUMMARY OF THE INVENTION

The present invention is an anti-reflection film that comprises a high-refractive-index layer having a refractive index of 1.65 to 2.40 and a low-refractive-index layer having a refractive index of 1.20 to 1.55, wherein the high-refractive-index layer is formed by coating and hardening a coating solution composition that contains inorganic fine particles having an average particle size of 1 to 200 nm and being dispersed with a polymer having a crosslinking-reactive group.

Further, the present invention is a method for producing the above anti-reflection film.

Furthermore, the present invention is an image display device provided with the above anti-reflection film.

Other and further features and advantages of the invention will appear more fully from the following description, taken in connection with the accompanying drawings.

BRIEF DESCRIPTION OF THE DRAWINGS

FIG. 1(a) is an example of 4-layer constitution. FIG. 1(b) is an example of 5-layer constitution.

DETAILED DESCRIPTION OF THE INVENTION

Figure 1:
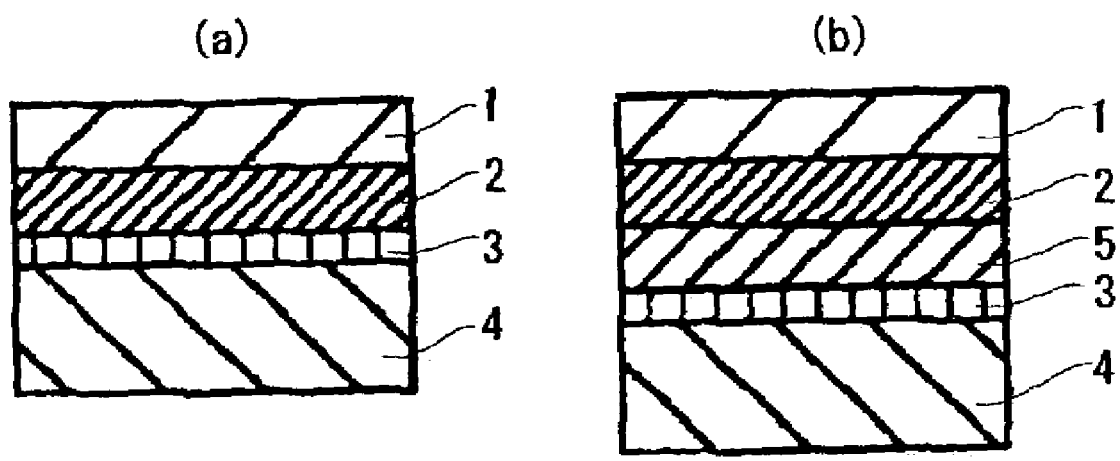
FIG. 1 is cross-sectional views schematically illustrating examples of a layer constitution when the anti-reflection film of the present invention is a composite film.

As a result of intensive studies, the present inventors have discovered that not only mechanical strength of the film, but also alkali processing-resistance is improved by changing a compound for dispersing inorganic fine particles (i.e. a dispersing agent) into a high molecular mass compound in advance of forming a film, and also by letting the dispersing agent itself have a crosslinking reaction site (crosslinkable site). The present invention has been made based on these findings.

According to the present invention, there are provided:

(1) A method for producing an anti-reflection film comprising a high-refractive-index layer having a refractive index of 1.65 to 2.40 and a low-refractive-index layer having a refractive index of 1.20 to 1.55, wherein the high-refractive-index layer is formed by coating and hardening a coating solution composition that contains inorganic fine particles having an average particle size of 1 to 200 nm and being dispersed with a polymer having a crosslinking-reactive group (hereinafter referred to as "a crosslinkable group").

(2) The method for producing an anti-reflection film according to the item (1), wherein the crosslinkable group is an acryl group, a methacryl group or an allyl group.

(3) The method for producing an anti-reflection film according to the item (1) or (2), wherein the polymer in the coating solution composition of the high-refractive-index layer has an anionic group.

(4) The method for producing an anti-reflection film according to the item (3), wherein the anionic group is a carboxyl group, a phosphoric group, a sulfo group, or a salt of these acid groups.

(5) The method for producing an anti-reflection film according to any one of the items (1) to (4), wherein the coating solution composition of the high-refractive-index layer further contains a polyfunctional monomer.

(6) The method for producing an anti-reflection film according to any one of the items (1) to (5), wherein the coating solution composition of the high-refractive-index layer contains a compound having an amino group or an ammonium group.

(7) The method for producing an anti-reflection film according to any one of the items (1) to (6), wherein the inorganic fine particles have a refractive index of 1.80 to 2.80.

(8) The method for producing an anti-reflection film according to any one of the items (1) to (7), wherein the low-refractive-index layer is formed by hardening a composition that contains a fluorine-containing polymer.

(9) An anti-reflection film produced by the method according to any one of the items (1) to (8).

(10) An image display device provided with the anti-reflection film according to the item (9).

The anti-reflection film of the present invention may have a layer constitution having only the low-refractive-index layer and the high-refractive-index layer, or may have another layer constitution in which these layers are superposed together with other layers, such as a middle-refractive-index layer and a hard coat layer. The anti-reflection film may be applied to an image display device after the anti-reflection film is formed, or it may be directly (in situe) formed on the image display device.

The anti-reflection film of the present invention will be explained below.

{Layer Structure of the Anti-Reflection Film}

With reference to FIG. 1, a typical example of a layer structure of the anti-reflection film will be explained.

FIG. 1 is sectional schematic views illustrating an example of a preferable layer structure of the anti-reflection film of the present invention. The embodiment shown in FIG. 1(a) has a layer structure wherein a transparent support (4), a hard coat layer (3), a high-refractive-index layer (2) and a low-refractive-index layer (1) are arranged in this order. In an anti-refraction film having a high-refractive-index layer (2) and a low-refractive-index layer (1), as the one shown in FIG. 1(a), it is preferable that the high-refractive-index layer satisfy the following expression (I) and the low-refractive-index layer satisfy the following expression (II), respectively, as described in JP-A-59-50401:

$$\frac{m}{4}\lambda \times 0.7 < n_1 d_1 < \frac{m}{4}\lambda \times 1.3 \quad (I)$$

wherein m is a positive integral number (generally 1, 2 or 3), $n_1$ is the refractive index of the high-refractive-index layer, and $d_1$ is the thickness (nm) of the high-refractive-index layer;

$$\frac{n}{4}\lambda \times 0.7 < n_2 d_2 < \frac{n}{4}\lambda \times 1.3 \quad (II)$$

wherein n is a positive odd number (generally 1), $n_2$ is the refractive index of the low-refractive-index layer, and $d_2$ is the thickness (nm) of the low-refractive-index layer. The embodiment shown in FIG. 1(b) has a layer structure wherein a transparent support (4), a hard coat layer (3), a middle-refractive-index layer (5), a high-refractive-index layer (2) and a low-refractive-index layer (1) are arranged in this order. In an anti-refraction film having a middle-refractive-index layer (5), a high-refractive-index layer (2) and a low-refractive-index layer (1), as the one shown in FIG. 1(b), it is preferable that the middle-refractive-index layer satisfy the following expression (III), the high-refractive-index layer satisfy the following expression (IV), and the low-refractive-index layer satisfy the following expression (V), respectively, as described in JP-A-59-50401:

$$\frac{h}{4}\lambda \times 0.7 < n_3 d_3 < \frac{h}{4}\lambda \times 1.3 \quad (III)$$

wherein h is a positive integral number (generally 1, 2 or 3), $n_3$ is the refractive index of the middle-refractive-index layer, and $d_3$ is the thickness (nm) of the middle-refractive-index layer;

$$\frac{j}{4}\lambda \times 0.7 < n_4 d_4 < \frac{j}{4}\lambda \times 1.3 \quad (IV)$$

wherein j is a positive integral number (generally 1, 2 or 3), $n_4$ is the refractive index of the high-refractive-index layer, and $d_4$ is the thickness (nm) of the low-refractive-index layer;

$$\frac{k}{4}\lambda \times 0.7 < n_5 d_5 < \frac{k}{4}\lambda \times 1.3 \quad (V)$$

wherein k is a positive odd number (generally 1), $n_5$ is the refractive index of the low-refractive-index layer, and $d_5$ is the thickness (nm) of the low-refractive-index layer. Further, λ in formulae (I) to (V) stands for a wavelength of light. When the anti-reflection film is used as an anti-reflection layer for a visible wavelength range, λ is within the range of 380 to 680 nm. The anti-reflection film is effective to not only visible radiation, but also ultraviolet radiation and infrared radiation nearby the visible wavelength range, accordingly λ can be a value within any of these ranges. The terms "high-refractive index", "middle-refractive index", and "low-refractive index" described herein mean relative magnitude of the refractive indices among layers. For example, the middle-refractive-index layer can be prepared by a method changing the content of inorganic particles in the high-refractive-index layer explained hereinafter, or the like methods.

The anti-reflection film having the above-described layer structure at least has a high-refractive-index layer improved according to the present invention.

{High-Refractive-Index Layer}

In the present invention, the high-refractive-index layer is formed by coating and hardening a coating solution that contains inorganic fine particles having an average particle size of 1 to 200 nm and being dispersed with a polymer having a crosslinkable group.

Figure 2:
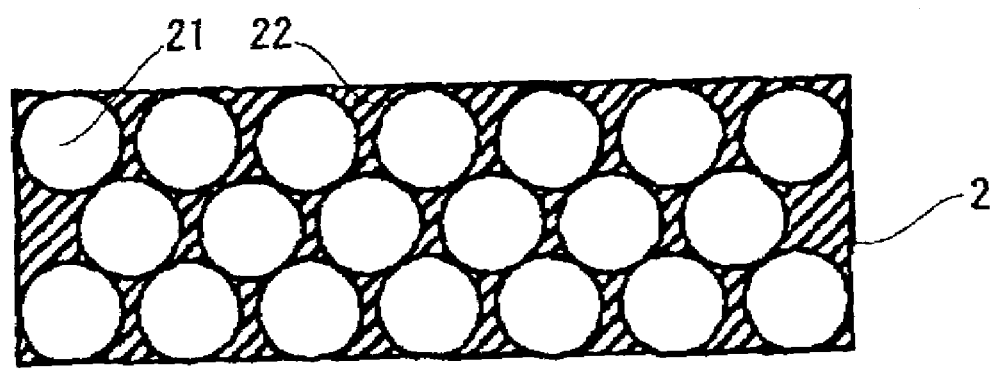
FIG. 2 is a cross-sectional view schematically illustrating an example of a high-refractive-index layer.

FIG. 2 is a cross-sectional view schematically illustrating an example of the high-refractive-index layer.

The low-refractive-index layer is superposed above the high-refractive-index layer shown in FIG. 2, and an image display device or a lens is placed below the high-refractive-index layer. As shown in FIG. 2, the high-refractive-index layer (2) is free of voids, and is a layer in which the polymer (22) is filled between inorganic fine particles (21). In the high-refractive-index layer (2), the inorganic fine particles (21) having an average particle size of 1 to 200 nm are superposed one on another (three particles are piled in FIG. 2). Further, the area between these inorganic fine particles (21) is filled with the crosslinked polymer (22) having an anionic group. The high-refractive-index layer has a refractive index in the range of 1.65 to 2.40, and preferably in the range of 1.70 to 2.20. The refractive index can be measured by the method using an Abbe's refractometer, or by estimation based on the reflectance of light from a layer surface. The high-refractive-index layer has a thickness preferably in the range of 5 nm to 10 μm, more preferably in the range of 10 nm to 1 μm, most preferably in the range of 30 nm to 0.5 μm. The haze of the high-refractive-index layer is preferably 5% or less, and more preferably 3% or less, and most preferably 1% or less. The high-refractive-index layer improved according to the present invention is excellent in mechanical strength. Specifically, the mechanical strength of the high-refractive-index layer is preferably H or harder, and more preferably 2H or harder, and most preferably 3H or harder, in terms of pencil hardness grades under 1 kg load.

{Inorganic Fine Particles in the High-Refractive-Index Layer}

The refractive index of the inorganic fine particles for use in the high-refractive-index layer is preferably 1.80 to 2.80, and more preferably 1.90 to 2.80. The mass-average particle size of primary particles of the inorganic fine particles is preferably 1 to 150 nm, more preferably 1 to 100 nm, and most preferably 1 to 80 nm. In the case that the inorganic fine particles are formed in the high-refractive-index layer, the mass-average particle size of the inorganic fine particles is generally 1 to 200 nm. The mass-average particle size of the inorganic fine particles in the high-refractive-index layer is preferably 5 to 150 nm, more preferably 10 to 100 nm, and most preferably 10 to 80 nm. The particle size of the inorganic fine particles can be measured by the light scattering method or through an electron microscopic photograph. The specific surface area of the inorganic fine particles is preferably 10 to 400 $m^2/g$, more preferably 20 to 200 $m^2/g$, and most preferably 30 to 150 $m^2/g$. The inorganic fine particles are preferably formed of metal oxides or metal sulfides. Examples of the metal oxides or metal sulfides include titanium dioxides (e.g., rutile, mixed crystals of rutile/anatase, anatase, amorphous structures), tin oxides, indium oxides, zinc oxides, zirconium oxides, and zinc sulfides. Titanium oxides, tin oxides, and indium oxides are particularly preferred. The inorganic fine particles contain these metal oxides or sulfides as a main component, and further they may contain additional elements. The term "main component" means a component having the largest content (% by mass) among those particle-composing elements. Examples of the additional elements include Ti, Zr, Sn, Sb, Cu, Fe, Mn, Pb, Cd, As, Cr, Hg, Zn, Al, Mg, Si, P, and S.

The inorganic fine particles may be subjected to a surface treatment. The surface treatment can be carried out using inorganic compounds or organic compounds. Examples of the inorganic compounds for use in the surface treatment include alumina, silica, zirconium oxide, and iron oxide. Alumina and silica are preferred. Examples of the organic compounds for use in the surface treatment include polyol, alkanol amine, stearic acid, a silane coupling agent, and a titanate coupling agent. The silane coupling agent is most preferred. Two or more kinds of surface treatments may be carried out in combination. The particles may have a core/shell structure as described in JP-A-2001-166104. Further, plural kinds of the techniques mentioned above may be combined to carry out surface treatment. The shape of the inorganic fine particles in the high-refractive-index layer is preferably rice grain-shaped, spherical, cubic, spindle-shaped, or amorphous. Two or more kinds of the inorganic fine particles may be used in the high-refractive-index layer. The ratio of the inorganic fine particles in the high-refractive-index layer is generally in the range of 5 to 65% by volume, preferably in the range of 10 to 60% by volume, and more preferably in the range of 20 to 55% by volume. The inorganic fine particles can be used in the state of dispersion when the high-refractive-index layer is formed. As a dispersion medium for the inorganic fine particles in the high-refractive-index layer, a liquid having boiling point of 60 to 170° C. is preferably used. Examples of the dispersing medium include water, alcohols (for example, methanol, ethanol, isopropanol, butanol and benzyl alcohol), ketones (for example, acetone, methylethylketone, methylisobutylketone and cyclohexanone), esters (for example, methyl acetate, ethyl acetate, propyl acetate, butyl acetate, methyl formate, ethyl formate, propyl formate, and butyl formate), aliphatic hydrocarbons (for example, hexane, and cyclohexane), halogenated hydrocarbons (for example, methylene chloride, chloroform, and tetrachlorocarbon), aromatic hydrocarbons (for example, benzene, toluene, and xylene), amides (for example, dimethylformamide, dimethylacetoamide, and n-methylpyrrolidone), ethers (for example, diethyl ether, dioxane, and tetrahydrofuran), and ether alcohols (for example, 1-methoxy-2-propanol). Especially preferable are toluene, xylene, methylethylketone, methylisobutylketone, cyclohexanone, and butanol. The inorganic fine particles can be dispersed in the medium with a dispersing machine. Examples of the dispersing machine include a sand grinder mill (for example, a beads-mill with pins), a high-speed impeller mill, a pebble mill, a roller mill, an attritor, and a colloid mill. The sand grinder mill and the high-speed impeller mill are especially preferable. Further, a preliminary dispersion treatment may be performed. Examples of the dispersing machine used in preliminary dispersion treatment include a ball mill, a three-roll mill, a kneader, and an extruder.

In the present invention, additives, such as a photopolymerization initiator and a binder precursor, necessary to form a matrix may be added to a dispersion of the above-mentioned inorganic fine particles finely dispersed in the presence of a polymer having a crosslinkable group explained below, to prepare a coating solution composition of the high-refractive-index layer.

(Crosslinkable Group-Containing Polymer)

Next, the crosslinkable group-containing polymer that is useful for dispersing the inorganic fine particles is explained below.

The above-said polymer is required to function as a dispersing agent of the inorganic fine particles, and as a crosslinked film-forming agent, at the same time. To make the polymer effective as a dispersing agent, it is preferable that the polymer is designed similarly to a well-known surfactant polymer. Specifically, polymers having an anionic group (will be explained later), a cationic group (such as a quaternary ammonium salt structure), a structure having both an anionic group and a cationic group (such as an amino acid structure), or a nonionic group (such as a polyethyleneoxide chain) are useful. Among these preferable polymers, the structure in which a polymer has an anionic group is especially preferable in a point of dispersing the inorganic fine particles for use in the present invention.

As the anionic group in the present invention, a group having an acidic proton such as a carboxyl group, a sulfo group, a phosphono group, a silanol group and a sulfonamide group, or salts of these groups are useful. Among these groups, a carboxyl group, a sulfo group, a phosphono group or salts of these groups are preferable. A carboxyl group is most preferable. Two or more kinds of these groups may be incorporated in the polymer.

The polymer useful for the present invention are generally those having the above-mentioned anionic group in a side chain or at an end of a polymer. The polymer having an anionic group in a side chain thereof can be synthesized by a method of using a high molecular reaction, such as a method of polymerizing monomers containing an anionic group (for example, (meth)acrylic acid, maleic acid, partially esterificated maleic acid, itaconic acid, crotonic acid, 2-carboxyethyl(meth)acrylate, 2-sulfoethyl(meth)acrylate, and phosphoric acid mono-2-(meth)acryloyloxyethylester), and a method of applying an acid anhydride to a polymer having a functional group such as a hydroxyl group and an amino group.

In the polymer having an anionic group in a side chain thereof, the percentage of the anionic group-containing polymerization unit is generally in the range of $10^{-4}$ to 100 mole %, preferably in the range of 1 to 50 mole %, and particularly preferably in the range of 5 to 20 mole %, of the entire polymerization unit respectively.

On the other hand, the polymer having an anionic group at an end thereof can be synthesized by a method of performing a polymerization reaction in the presence of a chain-transfer agent containing an anionic group (e.g. thioglycollic acid), a method of performing a polymerization reaction using a polymerization initiator containing an anionic group (e.g. V-501 (trade name) manufactured by Wako Pure Chemical Industries, Ltd.), and the like.

Examples of the crosslinkable group that can be used in the present invention include, for example, an ethylenically unsaturated group that is capable of causing an addition reaction or a polymerization reaction by radical species (such as a (meth)acryl group, an allyl group, a styryl group and a vinyloxy group), a cationic polymerization reactive group (such as an epoxy group, an oxatanyl group, and a vinyloxy group) and a polycondensation reactive group (such as a hydrolysable silyl group and a N-methylol group). Among these groups, the ethylenically unsaturated group is preferable. Two or more crosslinkable groups may be incorporated in the polymer.

The ethylenically unsaturated group that is capable of causing an addition reaction or a polymerization reaction by radical species, may be located in the main chain or a side chain of a polymer, and preferably it is located in a side chain. Examples of the polymerization unit having an ethylenically unsaturated group in the main chain of a molecule include structures such as poly-1,4-butadiene and poly-1,4-isoprene.

Examples of the polymerization unit having an ethylenically unsaturated group in a side chain of a molecule include structures such as poly-1,2-butadiene and poly-1,2-isoprene, and polymerization units of esters or amides of (meth) acrylic acid, to each of which a particular residue (i.e., the R group of —COOR or —CONHR) is bonded. Examples of the particular residue (the R group) include —$(CH_2)_n$—$CR_n$=$CR_2R_3$, —$(CH_2O)_n$—$CH_2CR_1$=$CR_2R_3$, —$(CH_2CH_2O)_n$—$CH_2CR_1$=$CR_2R_3$, —$(CH_2)_n$—NH—CO—O—$CH_2CR_1$=$CR_2R_3$, —$(CH)_n$—O—CO—$CR_1$=$CR_2R_3$ and —$(CH_2CH_2O)_2$—X (in which $R_1$, $R_2$ and $R_3$ each represent a hydrogen atom, a halogen atom, an alkyl group having 1 to 20 carbon atoms, an aryl group having 6 to 20 carbon atoms, an alkoxy group having 1 to 20 carbon atoms, or an aryloxy group having 6 to 20 carbon atoms, and $R_1$ and $R_2$ or $R_1$ and $R_3$ may combine with each other to form a ring; n is an integer of 1 to 10; and X is a dicyclopentadienyl residue). Examples of the ester residue include —$CH_2CH$=$CH_2$ (which corresponds to a polymer of allyl (meth)acrylate described in JP-A-64-17047), —$CH_2CH_2O$—$CH_2CH$=$CH_2$, —$CH_2CH_2OCOCH$=$CH_2$, —$CH_2CH_2OCOC(CH_3)$=$CH_2$, —$CH_2C(CH_3)$=$CH_2$, —$CH_2CH$=$CH$—$C_6H_5$, —$CH_2CH_2OCOCH$=$CH$—$C_6H_5$, —$CH_2CH_2$—NHCOO—$CH_2CH$=$CH_2$, and —$CH_2CH_2O$—X (in which X represents a dicyclopentadienyl residue). Examples of the amide residue include —$CH_2CH$=$CH_2$, —$CH_2CH_2$-1-Y (Y represents a cyclohexene group), —$CH_2CH_2$—OCO—CH=$CH_2$, and —$CH_2CH_2$—OCO—$C(CH_3)$=$CH_2$.

In the polymer having the above-mentioned ethylenically unsaturated group, free radicals (polymerization-initiating radicals or growing radicals during polymerization of polymerizable compounds) are added to its unsaturated bond groups; then, these polymers are polymerized in addition polymerization directly among polymers or via a polymerization chain of the polymerizable compounds; and a crosslink is caused among polymer molecules, resulting in hardening. Alternatively, certain atoms in the polymer (for example, a hydrogen atom on a carbon atom adjacent to the unsaturated bond group) are extracted by free radicals to form polymer radicals; then, these polymer radicals combine together with each other, thereby causing a crosslink among polymer molecules, resulting in hardening.

The polymer having a crosslinkable group can be synthesized by the production methods as described in JP-A-3-249653, such as a method in which de-hydrogen-chloride process is carried out after co-polymerization of monomers containing a crosslinkable group (such as allyl (meth)acrylate, glycidyl(meth)acrylate and trialkoxysilyl propyl(meth)acrylate), or after co-polymerization of butadiene or isoprene, or after co-polymerization of vinyl monomers having a 3-chloropropionic acid ester site; and a method in which a crosslinkable group is introduced by a macromolecular reaction (such as a macromolecular reaction by which an epoxy group-containing vinyl monomer is introduced into a carboxyl group-containing polymer).

The entire polymerization unit other than the anionic group-containing polymerization unit may be constructed of the crosslinkable group-containing polymerization unit. The percentage of the crosslinkable group-containing polymerization unit in the entire polymerization unit is preferably in the range of 5 to 50 mole %, and especially preferably in the range of 5 to 30 mole %.

The above-mentioned polymer may be a copolymer co-polymerized with an appropriate monomer other than the monomers having a crosslinkable group or an anionic group. The co-polymerizable component is not particularly limited, but preferably selected from various viewpoints such as dispersion stability, compatibility with other monomer components, and mechanical strength of the prepared film. Preferable examples of the co-polymerizable component include methyl(meth)acrylate, n-butyl(meth)acrylate, t-butyl(meth)acrylate, cyclohexyl(meth)acrylate, styrene, and the like.

The form of the above-mentioned polymer for use in the present invention is not particularly limited, but block copolymers and random copolymers are preferable. From the points of cost and ease of synthesis, the random copolymers are especially preferable. The molecular mass of the polymer is preferably in the range of 1,000 to 1,000,000, more preferably in the range of 5,000 to 200,000, and especially preferably in the range of 5,000 to 50,000. Polymers having a relatively small molecular mass, such as oligomers, may be used, but from the point of dispersing fine particles, high molecular polymers as mentioned above are preferable.

Specific examples of the polymer having a crosslinkable group and an anionic group that can be used in the present invention are shown below. However, the present invention is not limited thereto. Note that these chemical formulae represent a random copolymer, unless otherwise indicated.

$$-(CH_2-\underset{CO_2CH_2CH=CH_2}{\overset{CH_3}{\underset{|}{\overset{|}{C}}}})_x- \quad -(CH_2-\underset{CO_2H}{\overset{CH_3}{\underset{|}{\overset{|}{C}}}})_y- \quad -(CH_2-\underset{COOR}{\overset{CH_3}{\underset{|}{\overset{|}{C}}}})_z-$$

x, y, and z each represent a molar ratio of each component.

|       | x  | y  | z  | R                                                    | Mw      |
|-------|----|----|----|------------------------------------------------------|---------|
| P-(1) | 80 | 20 | 0  | —                                                    | 40,000  |
| P-(2) | 80 | 20 | 0  | —                                                    | 110,000 |
| P-(3) | 80 | 20 | 0  | —                                                    | 10,000  |
| P-(4) | 90 | 10 | 0  | —                                                    | 40,000  |
| P-(5) | 50 | 50 | 0  | —                                                    | 40,000  |
| P-(6) | 30 | 20 | 50 | $CH_2CH_2CH_3$                                       | 30,000  |
| P-(7) | 20 | 30 | 50 | $CH_2CH_2CH_2CH_3$                                   | 50,000  |
| P-(8) | 70 | 20 | 10 | $CH(CH_3)_3$                                         | 60,000  |
| P-(9) | 70 | 20 | 10 | $-CH_2CHCH_2CH_2CH_3$ with $CH_2CH_3$ branch         | 150,000 |
| P-(10)| 40 | 30 | 30 | $-CH_2-C_6H_5$                                       | 15,000  |

$$-(CH_2-\underset{CO_2CH_2CH=CH_2}{\overset{CH_3}{\underset{|}{\overset{|}{C}}}})_{80}- \quad -(A)_{20}-$$

|        | A                                                          | Mw      |
|--------|------------------------------------------------------------|---------|
| P-(11) | $-CH_2-CH(COOH)-$                                          | 20,000  |
| P-(12) | $-CH_2-CH(CO_2CH_2CH_2COOH)-$                              | 30,000  |
| P-(13) | $-CH_2-CH(C_6H_4SO_3Na)-$                                  | 100,000 |
| P-(14) | $-CH_2-C(CH_3)(CO_2CH_2CH_2SO_3H)-$                        | 20,000  |

-continued

| | | Mw |
|---|---|---|
| P-(15) | $-CH_2-\underset{\underset{CO_2CH_2CH_2OP(OH)_2}{|}}{\overset{\overset{CH_3}{|}}{C}}-$ ... $\overset{O}{\|}$ | 50,000 |
| P-(16) | $-CH_2-\underset{\underset{CO_2CH_2CH_2O-(CH_2)_5-OP(OH)_2}{|}}{CH}-$ ... $\overset{O}{\|}$ | 15,000 |

$-(A)_{80}- \quad -(CH_2-\underset{\underset{COOH}{|}}{\overset{\overset{CH_3}{|}}{C}})_{20}-$

| | A | Mw |
|---|---|---|
| P-(17) | $-CH_2-\underset{\underset{COOCH_2CH_2OCH=CH-C_6H_5}{|}}{\overset{\overset{CH_3}{|}}{C}}-$ | 20,000 |
| P-(18) | $-CH_2-\underset{\underset{COOCH_2CH_2OCCH_2CH=CH_2}{|}}{CH}-$ $\overset{O}{\|}$ | 25,000 |
| P-(19) | $-CH_2-\underset{\underset{COO-CH_2-C_6H_4-CH=CH_2}{|}}{\overset{\overset{CH_3}{|}}{C}}-$ | 18,000 |
| P-(20) | $-CH_2-CH(-C_6H_4-OCCH_2CH=CH_2)-$ with $\overset{O}{\|}$ | 20,000 |
| P-(21) | $-CH_2-\underset{\underset{CONHCH_2CH_2OCCH=CH_2}{|}}{CH}-$ $\overset{O}{\|}$ | 35,000 |

$-(CH_2-\underset{\underset{COOR^1}{|}}{\overset{\overset{CH_3}{|}}{C}})_x- \quad -(CH_2-\underset{\underset{COOH}{|}}{\overset{\overset{CH_3}{|}}{C}})_y- \quad -(CH_2-\underset{\underset{COOR^2}{|}}{\overset{\overset{CH_3}{|}}{C}})_z-$

| | $R^1$ | $R^2$ | x | y | z | Mw |
|---|---|---|---|---|---|---|
| P-(22) | $CH_2CH_2O\overset{O}{\overset{\|}{C}}CH=CH_2$ | $C_4H_9$-n | 10 | 10 | 80 | 25,000 |
| P-(23) | $CH_2CH_2O\overset{O}{\overset{\|}{C}}CH=CH_2$ | $C_4H_9$-t | 10 | 10 | 80 | 25,000 |
| P-(24) | $CH_2CH_2O\overset{O}{\overset{\|}{C}}\underset{\underset{CH_3}{|}}{C}=CH_2$ | $C_4H_9$-n | 10 | 10 | 80 | 500,000 |

-continued

| ID | Structure | R | a | b | c | Mw |
|---|---|---|---|---|---|---|
| P-(25) | 4-methyl-3-hydroxycyclohexyl-CH₂OC(=O)CH=CH₂ | $C_4H_9$-n | 10 | 10 | 80 | 23,000 |
| P-(26) | 4-methyl-3-hydroxycyclohexyl-CH₂OC(=O)CH=CH₂ | $C_4H_9$-n | 80 | 10 | 10 | 30,000 |
| P-(27) | 4-methyl-3-hydroxycyclohexyl-CH₂OC(=O)CH=CH₂ | $C_4H_9$-n | 50 | 20 | 30 | 30,000 |
| P-(28) | 4-methyl-3-hydroxycyclohexyl-CH₂OC(=O)CH=CH₂ | $C_4H_9$-t | 10 | 10 | 80 | 20,000 |
| P-(29) | 4-methyl-3-hydroxycyclohexyl-CH₂OC(=O)CH=CH₂ | $CH_2CH_2OH$ | 50 | 10 | 40 | 20,000 |
| P-(30) | 4-methyl-3-hydroxycyclohexyl-CH₂OC(=O)C(CH₃)=CH₂ | $C_4H_9$-n | 10 | 10 | 80 | 25,000 |

P-(31): $-(CH_2-CH)-$ with phenyl bearing $-OCH_2CH(OC(=O)CH=CH_2)CH_2OOC-$ (2-COOH-phenyl) ; Mw = 60,000

P-(32): $-(CH_2-C(CH_3)(CO_2CH_2CH=CH_2))-S-COOH$ ; Mw = 10,000

P-(33): $-(CH_2-C(CH_3)(CO_2CH_2CH=CH_2))-S-CH(COOH)CH_2COOH$ ; Mw = 20,000

P-(34): $-(CH_2-CH(CO_2CH_2CH=CH_2))_{80}-(CH_2-CH(CO_2CH_2CH_2COOH))_{20}-$ ; Mw = 30,000 (Block copolymer)

-continued

P-(35)

$$-(CH_2-\underset{\underset{CO_2CH_2CH_2OCCH=CH_2}{|}}{\overset{\overset{CH_3}{|}}{C}})_{80}- \quad -(CH_2-\underset{\underset{\underset{O}{||}}{}}{\overset{\overset{COOH}{|}}{CH}})_{20}-$$

Mw = 15,000
(Block copolymer)

P-(36)

$$-(CH_2-\underset{\underset{CO_2CH_2-\triangleleft O}{|}}{\overset{\overset{CH_3}{|}}{C}})_{80}- \quad -(CH_2-\underset{\underset{CO_2H}{|}}{\overset{\overset{CH_3}{|}}{C}})_{20}-$$

Mw = 8,000

P-(37)

$$-(CH_2-\underset{\underset{CO_2CH_2CH_2CH_2Si(OCH_2CH_3)_3}{|}}{\overset{\overset{CH_3}{|}}{C}})_{80}- \quad -(CH_2-\underset{\underset{COOH}{|}}{\overset{\overset{CH_3}{|}}{C}})_{20}-$$

Mw = 5,000

P-(38)

$$-(CH-CH_2-O)_{80}- \quad -(CH-CH-O)_{20}-$$
$$\underset{CH_2-O-(CH_2)_3-OCCH_2=CH}{|} \quad \underset{CH_2O-(CH_2)_3-Si(OCH_2CH_3)_3}{|}$$
$$\underset{\underset{O}{||}}{}$$

Mw = 10,000

P-(39)

$$-(CH_2-\underset{\underset{CO_2CH_2CH=CH_2}{|}}{\overset{\overset{CH_3}{|}}{C}})_{80}- \quad -(CH_2-\underset{\underset{COOCH_2CH_2\overset{\oplus}{N}(CH_3)_3\overset{\ominus}{Cl}}{|}}{\overset{\overset{CH_3}{|}}{C}})_{20}-$$

Mw = 20,000

P-(40)

$$-(CH_2-\underset{\underset{CONHCH_2CH=CH_2}{|}}{CH})_{80}- \quad -(CH_2-\underset{\underset{CONHCH_2CH_2N(CH_3)_2}{|}}{CH})_{20}-$$

Mw = 9,000

The above-mentioned polymer that has a crosslinkable group and acts as a dispersing agent is used preferably in an amount in the range of 1 to 50 mass %, more preferably in the range of 5 to 40 mass %, and especially preferably in the range of 10 to 30 mass %, of the inorganic fine particles respectively.

(Binder Monomer)

In the present invention, in addition to the above-mentioned dispersing agent, a compound that acts as a binder monomer and is capable of hardening simultaneously with coating or after coating is preferably added separately from the dispersing agent. Herein, the compound that acts as a binder monomer may be those hardened by the action of energy from the outside such as light and heat. Such a compound has at least one, preferably two or more polymerizable groups in a molecule. The compound may be a mixture of two or more of such compounds. Further, the compound may be in the chemical form such as a prepolymer, namely a dimmer, a trimer and oligomer, or a mixture or copolymer of these prepolymers. In the present invention, multifunctional monomers having two or more functional groups are particularly preferable. Particularly, multifunctional monomers having 3 to 6 functional groups are preferably used.

Examples include a compound that has in its molecule a plurality of groups selected from an ethylenically unsaturated group (such as a (meth)acryl group and a vinyloxy group), a ring-opening polymerization reactive group (such as an epoxy group, an oxetanyl group, an oxazolyl group) and a polycondensation reactive group (such as an alkoxysilyl group and a N-methylol group); a compound that has in its molecule a plurality of polyaddition reactive groups (such as a combination of a compound having in its molecule a plurality of groups selected from an isocyanate group, an epoxy group, and an acid anhydride structure and a compound having in its molecule a plurality of groups selected from a hydroxyl group, an amino group and a carboxyl group), and the like. Known hardening agents (such as compounds described in *Nihon Secchaku Kyokai shi*, Vol. 20, No. 7, pp. 300 to 308 (1984)) may also be used.

Among these compounds, compounds having in their molecules a plurality of ethylenically unsaturated groups or ring-opening polymerization reactive groups are preferred. Particularly, compounds having a plurality of ethylenically unsaturated groups are preferable.

Preferable examples of the compounds having a plurality of ethylenically unsaturated groups include esters of unsaturated carboxylic acids (such as acrylic acid, methacrylic acid, itaconic acid, crotonic acid, iso crotonic acid, and maleic acid) and aliphatic polyhydric alcohol compounds, and amides of the above-mentioned unsaturated carboxylic acids and aliphatic multivalent amine compounds.

Specific examples of monomers of the esters formed from aliphatic polyhydric alcohol compounds and unsaturated carboxylic acids are explained below.

As the acrylic acid esters, there are ethyleneglycol diacrylate, triethyleneglycol diacrylate, 1,3-butanediol diacrylate, tetramethyleneglycol diacrylate, propyleneglycol diacrylate, neopentylglycol diacrylate, trimethylolpropane triacrylate, trimethylolpropane tri(acryloyloxy propyl)ether, trimethylolethane triacrylate, hexanediol diacrylate, 1,4-cyclohexanediol diacrylate, tetraethyleneglycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaaacrylate, sorbitol hexaacrylate, tri(acryloyloxyethyl)isocyanurate and polyester acrylate oligomers, and the like.

As the methacrylic acid esters, there are tetramethyleneglycol dimethacrylate, triethyleneglycol dimethacrylate, neopentylglycol dimethacrylate, trimethylolpropane trimethacrylate, trimethylolethane trimethacrylate, ethyleneglycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis[p-(3-methacryloxy-2-hydroxypropoxy)phenyl]dimethylmethane, bis-[p-(methacryloxyethoxy)phenyl]dimethylmethane, and the like.

As the itaconic acid esters, there are ethyleneglycol diitaconate, propyleneglycol diitaconate, 1,3-butanediol diitaconate, 1,4-butanediol diitaconate, tetramethyleneglycol diitaconate, pentaerythritol diitaconate, sorbitol diitaconate, and the like.

As the crotonic acid esters, there are ethyleneglycol dicrotonate, tetramethyleneglycol dicrotonate, pentaerythritol dicrotonate, sorbitol tetra/dicrotonate, and the like. As the isocrotonic acid esters, there are ethyleneglycol diisocrotonate, pentaerythritol diisocrotonate, sorbitol tetraisocrotonate, and the like.

As the maleic acid esters, there are ethyleneglycol dimaleate, triethyleneglycol dimaleate, pentaerythritol dimaleate, sorbitol tetramaleate, and the like. Further, a mixture of the above-mentioned ester monomers may also be used. Further, specific examples of monomers of the amides formed from aliphatic multivalent amine compounds and unsaturated carboxylic acids include methylene bis-acrylamide, methylene bis-methacrylamide, 1,6-hexamethylene bis-acrylamide, 1,6-hexamethylene bis-acrylamide, diethylenetriamine tris-acrylamide, xylylene bis-acrylamide, xylylene bis-methacrylamide, and the like.

As examples of monomers other than the above, there is a vinylurethane compound having two or more polymerizable vinyl groups in its molecule, which compound is obtained by adding a hydroxyl group-containing vinyl monomer represented by formula (A) shown below, to a polyisocyanate compound having two or more isocyanate groups in its molecule, and this compound is described in JP-B-48-41708 ("JP-B" means examined Japanese patent publication).

CH$_2$=C(R)COOCH$_2$CH(R')OH  (A)

In formula (A), R and R' each represent H or CH$_3$.

Further, there are multifunctional acrylate and methacrylate compounds such as urethane acrylates as described in JP-A-51-37193, polyester acrylates as described in JP-A-48-64183, JP-B-49-43191, JP-B-52-30490 and epoxy acrylates obtained by reaction between an epoxy resin and a (meth)acrylic acid.

The amount of these multifunctional monomers is preferably in the range of 2 to 96 mass %, more preferably in the range of 4 to 94 mass %, and especially preferably in the range of 8 to 92 mass %, of the entire organic components in a coating solution composition for forming a high-refractive-index layer.

In the binder monomer for use in the present invention, a monomer having an amino group or a quarternary ammonium group is preferably incorporated in order to maintain a good dispersion state of the inorganic fine particles. As the amino group or the quaternary ammonium group, a secondary amino group, a tertiary amino group and a quaternary ammonium group are preferred. A tertiary amino group and a quarternary ammonium group are more preferable. The substituent that may be bonded to the nitrogen atom of the secondary or tertiary amino group, or the quarternary ammonium group is preferably an alkyl group, more preferably an alkyl group having 1 to 12 carbon atoms, and furthermore preferably an alkyl group having 1 to 6 carbon atoms. The counter ion to the quarternary ammonium ion is preferably a halide ion.

As the monomers having an amino group or a quarternary ammonium group, commercially available monomers may be used. Preferable examples of the commercially available monomers having an amino group or a quaternary ammonia, include DMAA (trade name, manufactured by Osaka Organic Chemical Industries Ltd.), DMAEA, DMAPAA (trade names, manufactured by Kohjin Co., Ltd.), BLEMER QA (trade name, manufactured by NOF Corp.), and New frontier C-1615 (trade names, manufactured by Dai-ichi Kogyo Seiyaku Co., Ltd.).

The amount of the monomers having an amino group or a quarternary ammonium group is preferably in the range of 0.05 to 40 mass %, more preferably in the range of 0.1 to 35 mass %, and particularly preferably in the range of 3 to 33 mass %, of the polymer that acts as a dispersing agent.

Further, in the binder precursors that can be used in the present invention, a monomer having a benzene ring (which monomer may have a substituent such as halogen atoms except for a fluorine atom), and the like may be optionally incorporated for enhancement of a refractive index. As such monomers, bisphenol A-di(meth)acrylate or its substitution product substituted with a bromine atom or an iodine atom are exemplified as-preferable examples. The amount of said monomers is preferably in the range of 2 to 96 mass %, more preferably in the range of 4 to 94 mass %, and especially preferably in the range of 8 to 92 mass %, of the entire organic components.

(Polymerization Initiator)

As the polymerization reaction of a binder precursor in the high-refractive-index layer, a photopolymerization reaction and a thermal polymerization reaction can be used. The photopolymerization reaction is preferable, and a polymerization initiator is preferably used.

Examples of radical polymerization initiators include acetophenones, benzoins, benzophenones, phosphine oxides, ketals, anthraquinones, thioxanthones, azo compounds, peroxides, 2,3-dialkyldione compounds, disulfide compounds, fluoroamine compounds, and aromatic sulfoniums.

Examples of acetophenones include 2,2-diethoxyacetophenone, p-dimethylacetophenone, 1-hydroxydimethyl phenyl ketone, 1-hydroxycyclohexyl phenyl ketone, 2-methyl-4-methylthio-2-morpholinopropiophenone, and 2-benzyl-2-dimethylamino-1-(4-morpholinophenyl)-butanone. Examples of benzoins include benzoin methyl ether, benzoin ethyl ether, and benzoin isopropyl ether. Examples of benzophenones include benzophenone, 2,4-dichlorobenzophenone, 4,4-dichlorobenzophenone, and p-chlorobenzophenone. Examples of phosphine oxides include 2,4,6-trimethylbenzoyl diphenylphosphine oxide.

As examples of cationic polymerization initiators, various compounds are described in, for example, "Imeizingu yo Yuki Zairyo" edited by Yuki Erekutoronikusu Zairyo Kenkyukai (Bunshin Shuppan), pp. 187 to 198, and JP-A-10-

282644. The compounds known from these publications may be used in the present invention. Specific examples of these compounds include various kinds of onium salts such as diazonium salts, ammonium salts, phosphonium salts, iodonium salts, sulfonium salts, selenonium salts and arsonium salts, each of which has a counter ion such as $RSO_3^-$ (R represents an alkyl group, or an aryl group), $AsF_6^-$, $SbF_6^-$, $PF_6^-$ and $BF_4^-$; organic halides such as oxadiazole derivatives and S-triazine derivatives, each of which is substituted with a trihalomethyl group; organic acid esters such as o-nitrobenzyl esters, benzoin esters and imino esters; and disulfone compounds. Among these compounds, onium salts are preferable. Particularly, sulfonium salts and iodonium salts are preferable.

Commercially available polymerization initiators may be used. In order to enhance a light absorption efficiency of said polymerization initiator, a sensitizer such as naphthalene derivatives may be used in combination therewith. The amount of the polymerization initiator and sensitizer is preferably in the range of 0.2 to 10 mass % of the entire amount of monomers.

In the case that a polymer is formed using a photopolymerization reaction, a low pressure-mercury lamp, a high pressure-mercury lamp, an ultrahigh pressure-mercury lamp, a chemical lamp or a metal halide lamp can be used as a light source. The high pressure-mercury lamp, which is excellent in irradiation efficiency, is most preferably used. Polymerization of the monomers (or oligomers) may be accelerated by heating a coating solution (a dispersion solution of inorganic fine particles, which solution contains the monomers). After coating and a subsequent photopolymerization reaction, a thermo-hardening reaction of the prepared polymer may be further carried out by heating. A percentage of the organic component in the high-refractive-index layer is generally in the range of 35 to 95 volume %, preferably in the range of 40 to 90 volume %, and particularly preferably in the range of 45 to 80 volume %. It is allowable to add, to the coating solution of the high-refractive-index layer, not only the above-mentioned components (the inorganic fine particles, the dispersant, the binder precursor, the dispersing medium, the polymerization initiator, and the polymerization accelerator) but also a polymerization inhibitor, a leveling agent, a thickener, an anti-coloring agent, an ultraviolet ray absorber, a silane coupling agent, an antistatic agent, and an adhesive agent. Examples of the leveling agent include fluorinated alkyl esters (for example, FC-430 and FC-431 (trade names) manufactured by Sumitomo 3M Ltd.), and polysiloxanes (for example, SF1023, SF1054, and SF1079 (trade names) manufactured by General Electric Co.; DC190, DC200, DC510, and DC1248 (trade names) manufactured by Dow Corning Co.; and BYK300, BYK310, BYK320, BYK322, BYK330, and BYK370 (trade names) manufactured by BYK Chemie Co.).

{Low-Refractive-Index Layer}

The low-refractive-index layer is disposed above the high-refractive-index layer as shown in FIGS. 1(*a*) and 1(*b*). The upper side of the low-refractive-index layer is generally the outer surface of the anti-reflection film.

The low-refractive-index layer has a refractive index preferably in the range of 1.20 to 1.55, more preferably in the range of 1.30 to 1.50, and particularly preferably in the range of 1.35 to 1.45.

The low-refractive-index layer has a thickness preferably in the range of 50 to 400 nm, and more preferably in the range of 50 to 200 nm. The haze of the low-refractive-index layer is preferably 3% or less, more preferably 2% or less, and most preferably 1% or less. The mechanical strength of the low-refractive-index layer is preferably H or harder, more preferably 2H or harder, and most preferably 3H or harder in terms of pencil grade according to the pencil hardness test under the load of 1 kg.

Examples of materials having the above-mentioned characteristics include inorganic low-reflection materials prepared by atomizing inorganic materials such as LiF (refractive index n=1.4), $MgF_2$ (n=11.4), 3 $NaF.AlF_3$ (n=1.4), $AlF_3$ (n=1.4), $Na_3AlF_6$ (n=1.33) and $SiO_2$ (n=1.45), and then incorporating the resulting fine particles into an medium such as an acryl resin and an epoxy resin; and organic low-reflection materials, such as fluorine-series or silicon-series organic compounds, thermoplastic resins, thermosetting resins, and radiation-setting resins. Among these materials, fluorine-containing materials are especially preferable in view of anti-stain (anti-smudge).

Examples of the fluorine-containing material include fluorinated vinylidene-series copolymers that are soluble in an organic solvent and easy to handle, and fluoroolefin/hydrocarbon olefin copolymers, fluorine-containing epoxy resins, fluorine-containing epoxy acrylates, fluorine-containing silicones, fluorine-containing alkoxy silanes, and further include TEFRON (Trade mark) AF1600 (manufactured by DuPont, refractive index n=1.30), CYTOP (manufactured by Asahi Glass Co., Ltd., n=1.34), 17FM (manufactured by Mitsubishi Rayon Co., Ltd., n=1.35), Opstar JN-7212 (manufactured by JSR Co., n=1.40), Opstar JN-7228 (manufactured by JSR Co., n=1.42) and LR201 (manufactured by Nissan Chemical Industries, Ltd., n=1.38) (all trade names). These materials may be used singly or in combination of two or more.

Examples of the fluorine-containing material further include fluorine-containing methacrylates such as 2-(perfluorodecyl)ethyl methacrylate, 2-(perfluoro-7-methyloctyl) ethyl methacrylate, 3-(perfluoro-7-methyloctyl)-2-hydroxypropyl methacrylate, 2-(perfluoro-9-methyldecyl)ethyl methacrylate, and 3-(perfluoro-8-methyldecyl)-2-hydroxypropyl methacrylate; fluorine-containing acrylates such as 3-perfluorooctyl-2-hydroxypropyl acrylate, 2-(perfluorodecyl)ethyl acrylate and 2-(perfluoro-9-methyldecyl)ethyl acrylate; epoxides such as 3-perfluorodecyl-1,2-epoxypropane and 3-(perfluoro-9-methyldecyl)-1,2-epoxypropane; and radiation-setting type fluorine-containing monomers, oligomers or prepolymers, such as epoxy acrylates. These materials may be used singly or in combination of two or more.

Further, a low-reflection material that is prepared by mixing a fluorine-series film-forming agent with a sol of ultrafine silica particles having a particle size of 5 to 30 nm and dispersed in water or an organic solvent may also be used. As the sol of ultrafine silica particles having a particle size of 5 to 30 nm and dispersed in water or an organic solvent, there are a known silica sol that is obtained by condensation of an activated silicic acid, which is known in a method of subjecting alkali metal ions in an alkali salt of silicic acid to dealkalization using ion exchange or like processings, or in a method of neutralizing an alkali salt of silicic acid with a mineral acid; a known silica sol that is obtained by hydrolysis and condensation of alkoxy silane in an organic solvent in the presence of a basic catalysts; and a silica sol in an organic solvent (organo silica sol) that is obtained by replacement of water in the above-mentioned aqueous silica sol with an organic solvent using a distillation process or like processings.

The silica sol is added preferably in the range of 5 to 50 mass %, more preferably in the range of 10 to 40 mass %, and particularly preferably in the range of 5 to 30 mass %, of the entire solid content in the low-refractive-index layer (low n layer) respectively.

{Transparent Support}

The anti-reflection film preferably has a transparent support, except for the case where the anti-reflection film is directly placed on a CRT image displaying surface or a lens surface. As the transparent support, a plastic film is more preferably used than a glass plate. Examples of materials to form the plastic film include cellulose esters (e.g., triacetyl cellulose, diacetyl cellulose, propionyl cellulose, butyryl cellulose, acetylpropionyl cellulose, and nitro cellulose), polyamides, polycarbonates, polyesters (e.g., polyethylene terephthalate, polyethylene naphthalate, poly-1,4-cyclohexanedimethylene terephthalate, polyethylene-1,2-diphenoxyethane-4,4'-dicarboxylate, polybutylene terephthalate), polystyrene (e.g., syndiotactic polystyrene), polyolefins (e.g., polypropyrene, polyethylene, and polymethylpentene), polysulfones, polyethersulfones, polyarylates, polyether imides, polymethylmethacrylates, and polyether ketones. Triacetyl cellulose, polycarbonate, polyethylene terephthalate and polyethylene naphthalate are preferred. The light transmittance of the transparent support is preferably 80% or more, and more preferably 86% or more. The haze of the transparent support is preferably 2.0% or less, and more preferably 1.0% or less. The refractive index of the transparent support is preferably in the range of 1.4 to 1.7. An infrared-ray absorbing agent or an ultra-violet-ray absorbing agent may be added to the transparent support. The amount of the infrared-ray absorbing agent to be added is preferably 0.01 to 20 mass % of the transparent support, and more preferably 0.05 to 10 mass %. Further, as a lubricant, particles of an inactive inorganic compound may be added to the transparent support. Examples of such an inorganic compound include $SiO_2$, $TiO_2$, $BaSO_4$, $CaCO_3$, talc and kaoline. The transparent support may be subjected to a surface treatment.

Examples of the surface treatment include a treatment by chemicals, a mechanical treatment, a corona discharge treatment, a flame treatment, a UV radiation treatment, a high-frequency treatment, a glow discharge treatment, an active plasma treatment, a laser treatment, a mixed-acid treatment, and an ozone-oxidation treatment. Among these examples, a glow discharge treatment, a UV radiation treatment, a corona discharge treatment and a flame treatment are preferable, and a glow discharge treatment and a UV radiation treatment are further more preferable.

{Middle-Refractive-Index Layer}

As shown in FIG. 1(b), a middle-refractive-index layer may be disposed between the high-refractive-index layer and the transparent support. The refractive index of the middle-refractive-index layer is adjusted so as to become a value between that of the low-refractive-index layer and that of the high-refractive-index layer. The refractive index of the middle-refractive-index layer is preferably in the range of 1.55 to 1.85. The middle-refractive-index layer is preferably formed using a polymer having a relatively high refractive index.

Examples of the polymer having a high refractive index include polystyrenes, styrene copolymers, polycarbonates, melamine resins, phenol resins, epoxy resins and polyurethanes obtained by a reaction between a cyclic (alicyclic or aromatic) isocyanate and a polyol. Polymers having other cyclic (aromatic, heterocyclic, alicyclic) groups and polymers having a halogen atom other than a fluorine atom, as a substituent, also have a high refractive index. Polymers may be formed by a polymerization reaction between monomers to which a double bond is introduced to enable radical hardening. Inorganic fine particles having a high refractive index may be dispersed in the above-mentioned polymers. When these inorganic fine particles having a high refractive index are used, even polymers having a relatively low-refractive index, such as vinyl polymers (including acrylic polymers), polyester polymers (including alkyd polymers), cellulose polymers, and urethane polymers, can be used in order to disperse the inorganic fine particles stably. Silicon compounds substituted with an organic group may be added to the middle-refractive-index layer. As the silicon compounds preferably used are various kinds of silane coupling agents (such as methacryloyloxypropyltrimethoxysilane, glycidoxypropyltrimethoxysilane, mercaptopropyltrimethoxysilane, aminopropyltrimethoxysilane, and tetraethoxysilane) or their hydrolysates.

As the inorganic fine particles, oxides of metals (such as aluminum, titanium, zirconium and antimony) are preferable. A powder or colloidal dispersion of the inorganic fine particles is used by mixing with the above-mentioned polymer or organic silicon compound. The inorganic fine particles preferably have an average particle size in the range of 10 to 200 nm. The middle-refractive-index layer may be formed from an organic metal compound having a film-forming ability. Preferably, the organic metal compound is a compound that can be dispersed in an appropriate medium, or is in a liquid form. Examples of the organic metal compound include metal alcolates (for example, titanium tetraethoxide, titanium tetra-1-propoxide, titanium tetra-n-propoxide, titanium tetra-n-butoxide, titanium tetra-sec-butoxide, titanium tetra-tert-butoxide, aluminum triethoxide, aluminum tri-i-propoxide, aluminum tributoxide, antimony triethoxide, antimony tributoxide, zirconium tetraethoxide, zirconium tetra-i-propoxide, zirconium tetra-n-propoxide, zirconium tetra-n-butoxide, zirconium tetra-sec-butoxide, and zirconium tetra-tert-butoxide), chelate compounds (for example, di-isopropoxytitanium bisacetylacetonate, di-butoxytitanium bisacetylacetonate, di-ethoxytitanium bisacetylacetonate, bisacetylacetone zirconium, aluminum acetylacetonate, aluminum-di-n-butoxide monoethylacetoacetate, aluminum-i-propoxide monomethylacetoacetate, and tri-n-butoxide zirconium monoethylacetoacetate), salts of organic acids (for example, zirconyl ammonium carbonate), and active inorganic polymers comprising zirconium as a main component. Alkylsilicates or their hydrolysates, and silica in a form of fine particles, (especially a colloidal dispersion of a silica gel) may be added to the middle-refractive-index layer. Particularly preferably the inorganic fine particles and the polymer to be used in the high-refractive-index layer are also used to form the middle-refractive-index layer, with adjusting a refractive index thereof so as to be a value lower than that of the high-refractive-index layer. The haze of the middle-refractive-index layer is preferably 3% or less.

{Other Layers}

The anti-reflection film may be further provided with a hard coat layer, a moisture-proof layer, an anti-static layer, a subbing layer (under coat layer) and a protective layer. The hard coat layer is disposed to give a scratch resistance to the transparent support. The hard coat layer also has a function to strengthen adhesion between the transparent support and a layer disposed thereon. The hard coat layer may be formed using acryl-series polymers, urethane-series polymers, epoxy-series polymers, silicon-series polymers, and/or silica-series compounds. A pigment may be added to the hard coat layer. The acryl-series polymers are preferably synthesized by a polymerization reaction of multifunctional acrylate monomers (for example, polyol acrylate, polyester acrylate, urethane acrylate, epoxy acrylate). Examples of the urethane-series polymers include melamine polyurethane. As the silicon-series polymers, co-hydrolysis products of a silane compound (e.g., tetraalkoxysilane, alkyltrialkoxysilane) and a silane-coupling agent having a reactive group (e.g., epoxy, methacryl) are preferably used. Two or more kinds of polymers may be used in combination. As the silica-series compounds, colloidal silica is preferably used. The strength of the hard coat layer is preferably H or harder, more preferably 2H or harder, and most preferably 3H or harder, in terms of pencil grades under 1 Kg of load. On the transparent support, an adhesion layer, a shield layer, a slipping layer and an antistatic layer may be superimposed in addition to the hard coat layer. The shield layer is disposed to shield electromagnetic waves and/or infrared radiation. A protective layer may be provided on the low-refractive-index layer. The protective layer acts as a slipping layer or a stainproofing layer.

Examples of a lubricant used in the slipping layer include polyorganosiloxanes (for example, polydimethylsiloxane, polydiethylsiloxane, polydiphenylsiloxane, polymethylphenylsiloxane, and alkyl-modified polydimethylsiloxane), natural waxes (for example, carnauba wax, candelilla wax, jojoba oil, rice wax, Japan wax, beeswax, lanolin, spermaceti wax, and montan wax), petroleum waxes (for example, paraffin wax, and microcrystalline wax), synthetic waxes (for example, polyethylene wax, Fisher-Tropsch wax), higher aliphatic acid amides (for example, stearamide, oleic amide, and N,N'-methylenebisstearamide), higher aliphatic esters (for example, methyl stearate, butyl stearate, glycerin monostearate, and sorbitan monooleate), metal salts of higher aliphatic acids (for example, zinc stearate), and fluorine-containing polymers (for example, perfluoro-main-chain-type perfluoropolyether, perfluoro-side-chain-type perfluoropolyether, alcohol-modified perfluoropolyether, and isocyanate-modified perfluoropolyether). For the stainproofing layer, a fluorine-containing compound (for example, a fluorine-containing polymer, a fluorine-containing surfactant and a fluorine-containing oil) is used. The thickness of the protective layer is preferably 20 nm or less so that the anti-reflection function is not impaired. Specifically, the protective layer has a thickness preferably in the range of 2 to 20 nm, more preferably in the range of 3 to 20 nm, and most preferably in the range of 5 to 10 nm.

{Anti-Reflection Film}

The various layers of the anti-reflection film can be formed by a coating method. Examples of the coating method include a dip coating method, air knife coating method, curtain coating method, roller coating method, wire bar coating method, gravure coating method, and extrusion-coating method (as disclosed in U.S. Pat. No. 2,681,294). Two or more than two layers may be formed by the simultaneous coating method. The references which make descriptions of this method include U.S. Pat. No. 2,761,791, U.S. Pat. No. 2,941,898, U.S. Pat. No. 3,508,947, U.S. Pat. No. 3,526,528 and "Coating Engineering" by Yuji Harasaki, page 253, 1973, Asakura Shoten. It is preferable that the reflectance of the anti-reflection film is as low as possible. Specifically, the average reflectance in the wavelength region of 450 to 650 nm is preferably 2% or less, more preferably 1% or less, and most preferably 0.7% or less. In the case where the anti-reflection film does not have an anti-glare function that will be described later, the haze of the anti-reflection film is preferably 3% or less, more preferably 1% or less, and most preferably 0.5% or less. The mechanical strength of the anti-reflection film is preferably H or harder, more preferably 2H or harder, and most preferably 3H or harder, in terms of pencil grades under 1 Kg of load. The anti-reflection film may have an anti-glare function that enables to scatter external lights. The anti-glare function may be obtained by forming fine irregularities on a surface of the anti-reflection film. When fine particles are used in the low-refractive-index layer, irregularities owing to the fine particles are formed on the surface of the anti-reflection film. If the anti-glare function obtained by the fine particles is not enough, a small amount (for example, 0.1 to 50 mass %) of relatively large fine particles (for example, particle size: 50 nm to 2 μm) may be added to the low-refractive-index layer, the high-refractive-index layer, the middle-refractive-index layer, or the hard coat layer). In the case that the anti-reflection film has an anti-glare function, the haze of the anti-reflection film is preferably 3 to 30%, more preferably 5 to 20%, and most preferably 7 to 20%. The anti-reflection film can be used in an image display device such as a liquid crystal display device (LCD), a plasma display panel (PDP), an electroluminescence display (ELD), and a cathode-ray-tube display device (CRT). The anti-reflection film is disposed so that the high-refractive-index layer is placed at the side of the image displaying surface (screen) of an image display device. In the case where the anti-reflection film has the transparent support, the anti-reflection film is attached to the image display device so that the transparent support side of the film is adhered to the image displaying surface of the image display device. The anti-reflection film may also be applied to a case cover, an optical lens, a lens for glasses, a window shield, a light cover, and a helmet shield.

The anti-reflection film of the present invention can be easily produced by a coating method, and it is suitable for mass production. Further, the anti-reflection film of the present invention has a high-refractive-index layer having both transparency and a remarkably high refractive index. The anti-reflection film of the present invention is excellent in mechanical strength of the film. The anti-reflection film of the present invention is excellent in alkali processing-resistance. Further, the anti-reflection film of the present invention is excellent in physical strength (such as scratch resistance and abrasion resistance) and its properties are not substantially impaired by a saponification processing. Using the above-mentioned anti-reflection film, reflection on image display (screen) surfaces of image display devices can be effectively prevented. The producing method of the present invention can produce the above-mentioned anti-reflection film with ease. Further, the image display device of the present invention is prevented from reflections.

The present invention is described in more detail with reference to the following examples, but the invention is not limited thereto.

EXAMPLES

Example 1

(Preparation of Titanium Dioxide Dispersion)

30 mass parts of titanium fine dioxide fine particles having a core/shell structure (TTO-55B (Trade name); shell material, alumina in an amount of 9 mass % to the entire particles, manufactured by Ishihara Sangyo Kaisha, Ltd.), 4.5 mass parts of a crosslinkable group-containing polymer P-(1), 0.3 mass part of a conventional cationic monomer (DMAEA (Trade name), N,N-dimethylamino ethylacrylate, manufactured by Kohjin Co., Ltd.), and 65.2 mass parts of cyclohexanone were dispersed by means of a sand grinder mill, to prepare a dispersion of titanium dioxide having a mass-average particle size of 53 nm.

(Preparation of Coating Solution for Middle-Refractive-Index Layer)

To 49.06 g of the above-mentioned titanium dioxide dispersion, 18.08 g of dipentaerythritol hexaacrylate (DPHA (Trade name), manufactured by Nippon Kayaku Co., Ltd.), 0.920 g of a photopolymerization initiator (Irgacure 907 (Trade name), manufactured by Ciba-Geigy), 0.307 g of a photosensitizer (Kayacure DETX (Trade name), manufactured by Nippon Kayaku Co., Ltd.), 230.0 g of methylethylketone and 500 g of cyclohexanone were added and stirred. The mixture was filtered through a polypropylene filter having a mesh of 0.4 μm, to prepare a coating solution of a middle-refractive-index layer.

(Preparation of Coating Solution for High-Refractive-Index Layer)

To 110.0 g of the above-mentioned titanium dioxide dispersion, 6.29 g of dipentaerythritol hexaacrylate (DPHA (Trade name), manufactured by Nippon Kayaku Co., Ltd.), 0.520 g of a photopolymerization initiator (Irgacure 907 (Trade name), manufactured by Ciba-Geigy), 0.173 g of a photosensitizer (Kayacure DETX (Trade name), manufactured by Nippon Kayaku Co., Ltd.), 230.0 g of methylethylketone and 460.0 g of cyclohexanone were added and stirred. The mixture was filtered through a polypropylene filter having a mesh of 0.4 μm, to prepare a coating solution of a high-refractive-index layer.

(Preparation of a Coating Solution for a Low-Refractive-Index Layer)

8.0 g of a dispersion of silica particles in methylethylketone (MEK-ST (trade name), solid content concentration: 30% by mass, manufactured by Nissan Chemical Industries, Co., Ltd.) and 100 g of methyl isobutyl ketone were added to 93.0 g of a thermally crosslinkable fluorine-containing polymer (JN-7228 (trade name), a refractive index: 1.42, solid content concentration: 6% by mass, manufactured by JSR Corporation). The mixture was stirred, and then subjected to filtration using a polypropylene filter having a pore diameter of 1 μm, to prepare a coating solution for a low-refractive-index layer.

(Preparation of a Coating Solution for a Hard Coat Layer)

125 g of a mixture of pentaerythritol pentaacrylate and dipentaerythritol hexaacrylate (DPHA (trade name), manufactured by Nippon Kayaku Co., Ltd.) and 125 g of urethane acrylate oligomer (UV-6300B (trade name), manufactured by The Nippon Synthetic Chemical Industry Co., Ltd.) were dissolved in 439 g of an industrial modified ethanol. To the resultant solution was added a solution in which 7.5 g of a photopolymerization initiator (Irgacure 907 (trade name), manufactured by Chiba Geigy Co.) and 5.0 g of a photosensitizer (Kayacure DETX (trade name), manufactured by Nippon Kayaku Co., Ltd.) were dissolved in 49 g of methyl ethyl ketone. After the resultant mixture was stirred, the coating solution for a hard coat layer was prepared by filtration using a polypropylene filter having a 1 μm mesh.

(Preparation of Anti-Reflection Film)

The above-mentioned coating solution of a hard coat layer was coated on a triacetyl cellulose film (TAC-DU (Trade name), manufactured by Fuji Photo Film Co., Ltd.) having a thickness of 80 μm, by using a bar coater, and dried at 90° C. Thereafter, an ultraviolet ray was irradiated to the coating layer to harden the layer. Thus, a hard coat layer having a thickness of 6 μm was formed.

The above-mentioned coating solution for a middle-refractive-index layer was coated on the hard coat layer by using a bar coater, and dried at 60° C. Thereafter, an ultraviolet ray was irradiated to the coating layer to harden the layer. Thus, a middle-refractive-index layer (refractive index: 1.70, coating thickness: 70 nm, TTB-55B: 21 volume %) was formed. The above-mentioned coating solution for a high-refractive-index layer was coated on the middle-refractive-index layer by using a bar coater, and dried at 60° C. Thereafter, an ultraviolet ray was irradiated to the coating layer to harden the layer. Thus, a high-refractive-index layer (refractive index: 1.95, coating thickness: 75 nm, TTB-55B: 51 volume %) was formed. The above-mentioned coating solution for a low-refractive-index layer was coated on the high-refractive-index layer by using a bar coater, and dried at 120° C. for 10 minutes. Thereafter, the temperature was allowed to cool down to room temperature, and the low-refractive-index layer (refractive index: 1.40, coating thickness: 85 nm) was formed. Thus, the anti-reflection film was prepared.

(Evaluation of Anti-Reflection Film)

The obtained anti-reflection film was evaluated on the following items:

(1) Evaluation of Average Reflectance

Spectral reflectance values were obtained at an incidence angle of 5 degrees in the wavelength region of 380 nm to 780 nm, by means of a spectrophotometer (manufactured by JASCO Corporation). Then, the average reflectance in the wavelength region of 450 to 650 nm was obtained.

(2) Evaluation of Haze

A haze value of the film was measured using a haze meter Model NHD-10001DP (trade name, manufactured by Nihon Denshoku Kogyo KK).

(3) Evaluation of Pencil Hardness Test

The anti-reflection film was humidified under the conditions of 25° C. and 60% R.H. for 2 hours. Thereafter, according to the evaluation method of the pencil hardness specified by JIS K5400, the pencil hardness at 1-kg load was evaluated using the testing pencil specified by JIS S6006.

(4) Evaluation of Scratch Resistance to Steel Wool

0000 steel wool under a loading condition of 200 g/cm² was reciprocated 10 times. A state of scratch thereafter was observed, and evaluated according to the following five grades:

A: No scratch observed.
B: Scratches slightly observed, but hardly noticeable.
C: Few scratches observed, and apparently noticeable.
D: Remarkable scratches observed, but a few scratch-free portions.
E: Scratches observed all over the surface.

(5) Evaluation of Saponification-Processing Resistance

A 1.5N aqueous solution of sodium hydroxide was prepared and kept at 50° C. The previously prepared anti-reflection film was soaked in the above-mentioned sodium hydroxide aqueous solution for 2 minutes, and then it was soaked in water to thoroughly wash away the sodium hydroxide aqueous solution. Subsequently, the film was soaked in a 0.01N aqueous solution of dilute sulfuric acid for 1 minute, and then it was soaked in water to thoroughly wash away the dilute sulfuric acid aqueous solution. Thereafter, the anti-reflection film was sufficiently dried at 100° C. With the thus-obtained anti-reflection film, property evaluations shown in the above (1) to (4) were conducted.

The obtained results are shown in Table 1.

Example 2

An anti-reflection film was prepared and evaluated in the same manner as in Example 1, except that the crosslinkable polymer used for dispersing titanium dioxide was replaced with P-(7). The obtained results are shown in Table 1.

Example 3

An anti-reflection film was prepared and evaluated in the same manner as in Example 1, except that the crosslinkable polymer used for dispersing titanium dioxide was replaced with P-(11). The obtained results are shown in Table 1.

Example 4

An anti-reflection film was prepared and evaluated in the same manner as in Example 1, except that the crosslinkable polymer used for dispersing titanium dioxide was replaced with P-(14). The obtained results are shown in Table 1.

Example 5

An anti-reflection film was prepared and evaluated in the same manner as in Example 1, except that the crosslinkable polymer used for dispersing titanium dioxide was replaced with P-(16). The obtained results are shown in Table 1.

Example 6

An anti-reflection film was prepared and evaluated in the same manner as in Example 1, except that the crosslinkable polymer used for dispersing titanium dioxide was replaced with P-(17). The obtained results are shown in Table 1.

Example 7

An anti-reflection film was prepared and evaluated in the same manner as in Example 1, except that the crosslinkable polymer used for dispersing titanium dioxide was replaced with P-(22). The obtained results are shown in Table 1.

Example 8

An anti-reflection film was prepared and evaluated in the same manner as in Example 1, except that the crosslinkable polymer used for dispersing titanium dioxide was replaced with P-(25). The obtained results are shown in Table 1.

Example 9

An anti-reflection film was prepared and evaluated in the same manner as in Example 1, except that the crosslinkable polymer used for dispersing titanium dioxide was replaced with P-(34). The obtained results are shown in Table 1.

Example 10

An anti-reflection film was prepared and evaluated in the same manner as in Example 1, except that the crosslinkable polymer used for dispersing titanium dioxide was replaced with P-(36) and the photopolymerization initiator in the coating solutions for the middle- and low-refractive-index layers was replaced with UV1699 (trade name, manufactured by UNION CARBIDE JAPAN KK), respectively. The obtained results are shown in Table 1.

Example 11

An anti-reflection film was prepared and evaluated in the same manner as in Example 1, except that no cationic monomer (DMAEA (Trade name), manufactured by Kohjin Co., Ltd.) was added to the dispersion of titanium dioxide. The obtained results are shown in Table 1.

Comparative Example 1

(Formulation Described in JP-A-2001-166104)

An anti-reflection film was prepared and evaluated in the same manner as in Example 1, except that the crosslinkable polymer P-(1) used for dispersing titanium dioxide was replaced with a commercially available anionic monomer PM-21 (trade name, manufactured by Nippon Kayaku Co., Ltd.). The obtained results are shown in Table 1.

TABLE 1

| | Before Saponification | | | | After Saponification | | | |
| --- | --- | --- | --- | --- | --- | --- | --- | --- |
| | Average Reflectance | Haze | Pencil Hardness | Steel Resistance | Average Reflectance | Haze | Pencil Hardness | Steel Resistance |
| Example 1 | 0.32% | 0.2% | 3H | A | 0.32% | 0.2% | 3H | A |
| Example 2 | 0.33% | 0.2% | 3H | A | 0.33% | 0.2% | 3H | A |
| Example 3 | 0.32% | 0.2% | 3H | A | 0.32% | 0.2% | 3H | A |
| Example 4 | 0.33% | 0.4% | 3H | B | 0.33% | 0.4% | 3H | C |
| Example 5 | 0.32% | 0.3% | 2H | C | 0.32% | 0.3% | 2H | D |
| Example 6 | 0.32% | 0.3% | 3H | B | 0.32% | 0.3% | 3H | B |
| Example 7 | 0.33% | 0.2% | 3H | B | 0.33% | 0.2% | 3H | B |
| Example 8 | 0.32% | 0.2% | 3H | A | 0.32% | 0.2% | 3H | A |
| Example 9 | 0.33% | 0.4% | 3H | B | 0.33% | 0.4% | 3H | B |
| Example 10 | 0.33% | 0.4% | 3H | A | 0.33% | 0.3% | 3H | B |
| Example 11 | 0.32% | 0.3% | 3H | B | 0.32% | 0.3% | 3H | D |
| Comparative example 1 | 0.32% | 0.3% | 2H | C | 0.32% | 0.3% | <H | E |

It is understood that the anti-reflection films prepared by the production method of the present invention were excellent in the film mechanical strength, compared to that of Comparative Example 1, and moreover their properties were not substantially impaired by the saponification processing.

Having described our invention as related to the present embodiments, it is our intention that the invention not be limited by any of the details of the description, unless otherwise specified, but rather be construed broadly within its spirit and scope as set out in the accompanying claims.

What is claimed is:

1. An anti-reflection film comprising a high-refractive-index layer having a refractive index of 1.65 to 2.40 and a low-refractive-index layer having a refractive index of 1.20 to 1.55, wherein the high-refractive-index layer is formed by coating and hardening a coating solution composition that contains a binder monomer and inorganic fine particles having an average particle size of 1 to 200 nm and being dispersed with a polymer having a crosslinkable group.

2. The anti-reflection film as claimed in claim 1, wherein the crosslinkable group is selected from an acryl group, a methacryl group and an allyl group.

3. The anti-reflection film as claimed in claim 1, wherein the polymer in the coating solution composition of the high-refractive-index layer has an anionic group.

4. The anti-reflection film as claimed in claim 1, wherein the coating solution composition of the high-refractive-index layer further comprises a polyfunctional monomer.

5. The anti-reflection film as claimed in claim 1, wherein the coating solution composition of the high-refractive-index layer further comprises a compound having an amino group or ammonium group.

6. The anti-reflection film as claimed in claim 1, wherein the inorganic fine particles have a refractive index of 1.80 to 2.80.

7. The anti-reflection film as claimed in claim 1, wherein the low-refractive-index layer is formed by hardening a composition comprising a fluorine-containing polymer.

8. The anti-reflection film as claimed in claim 1, wherein the molecular mass of the polymer is in the range of 1,000 to 1,000,000.

9. The anti-reflection film as claimed in claim 1, wherein the crosslinkable group is selected from an ethylenically unsaturated group, a cationic polymerization reactive group, and a polycondensation reactive group.

10. The anti-reflection film as claimed in claim 1, wherein the polymer having a crosslinkable group acts as a dispersing agent, and the polymer is used in an amount in the range of 1 to 50 mass % of the inorganic fine particles.

11. A method for producing an anti-reflection film comprising a high-refractive-index layer having a refractive index of 1.65 to 2.40 and a low-refractive-index layer having a refractive index of 1.20 to 1.55, which method comprises the steps of coating a coating solution composition that contains inorganic fine particles having an average particle size of 1 to 200 nm and being dispersed with a polymer having a crosslinkable group, and hardening the composition thereby forming the high-refractive-index layer.

12. The method for producing an anti-reflection film as claimed in claim 11, wherein the crosslinkable group is selected from an acryl group, a methacryl group and an allyl group.

13. The method for producing an anti-reflection film as claimed in claim 11, wherein the polymer in the coating solution composition of the high-refractive-index layer has an anionic group.

14. The method for producing an anti-reflection film as claimed in claim 11, wherein the coating solution composition of the high-refractive-index layer further comprises a polyfunctional monomer.

15. The method for producing an anti-reflection film as claimed in claim 11, wherein the coating solution composition of the high-refractive-index layer further comprises a compound having an amino group or ammonium group.

16. The method for producing an anti-reflection film as claimed in claim 11, wherein the inorganic fine particles have a refractive index of 1.80 to 2.80.

17. The method for producing an anti-reflection film as claimed in claim 11, wherein the low-refractive-index layer is formed by hardening a composition comprising a fluorine-containing polymer.

18. The method for producing an anti-reflection film as claimed in claim 11, wherein the molecular mass of the polymer is in the range of 1,000 to 1,000,000.

19. The method for producing an anti-reflection film as claimed in claim 11, wherein the crosslinkable group is selected from an ethylenically unsaturated group, a cationic polymerization reactive group, and a polycondensation reactive group.

20. The method for producing an anti-reflection film as claimed in claim 11, wherein the polymer having a crosslinkable group acts as a dispersing agent, and the polymer is used in an amount in the range of 1 to 50 mass % of the inorganic fine particles.

21. An image display device comprising an anti-reflection film, wherein the anti-reflection film comprises a high-refractive-index layer having a refractive index of 1.65 to 2.40 and a low-refractive-index layer having a refractive index of 1.20 to 1.55, and the high-refractive-index layer is formed by coating and hardening a coating solution composition that contains inorganic fine particles having an average particle size of 1 to 200 nm and being dispersed with a polymer having a crosslinkable group.

22. An anti-reflection film comprising a high-refractive-index layer having a refractive index of 1.65 to 2.40 and a low-refractive-index layer having a refractive index of 1.20 to 1.55, wherein the high-refractive-index layer is formed by a process comprising the following steps:

a coating step of coating a coating solution composition that contains inorganic fine particles having an average particle size of 1 to 200 nm and being dispersed with a polymer having a crosslinkable group, and a hardening step of hardening the coating solution composition by crosslinking the polymer having a crosslinkable group.

* * * * *